Oct. 19, 1948.   W. R. SPILLER   2,451,636
CUTTING MACHINE
Filed June 21, 1946
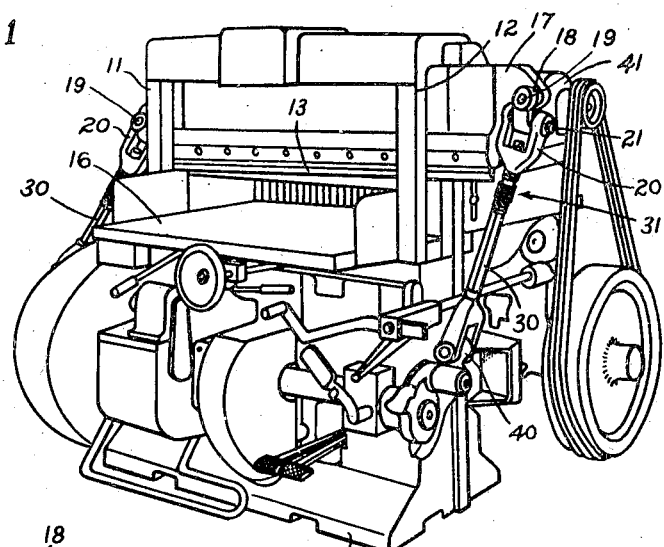
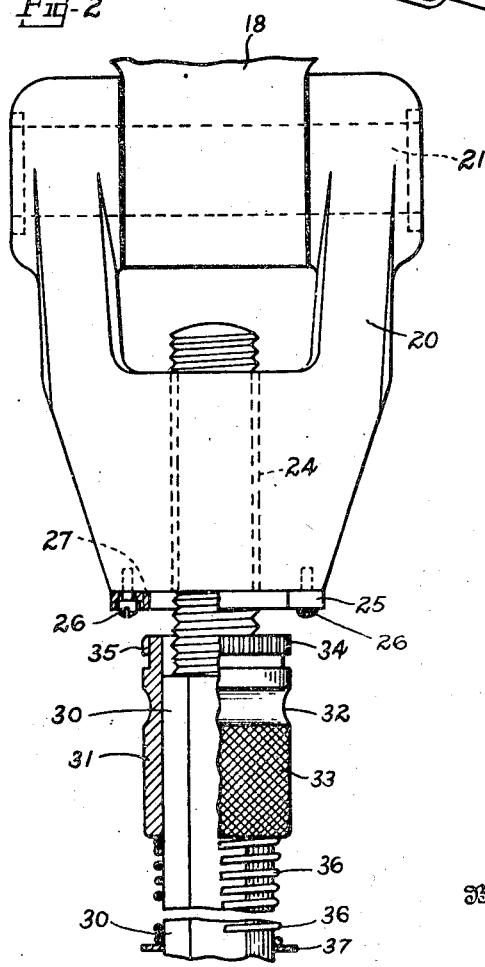
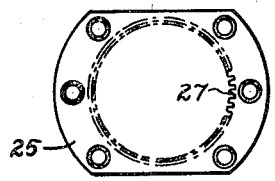
Inventor
William R Spiller
By Marshal & Biebel
Attorneys Patented Oct. 19, 1948

2,451,636

UNITED STATES PATENT OFFICE 2,451,636

CUTTING MACHINE

William R. Spiller, Dayton, Ohio, assignor to Harris-Seybold Company, Cleveland, Ohio, a corporation of Delaware Application June 21, 1946, Serial No. 678,485

5 Claims. (Cl. 164—54)

This invention relates to improvements in machines for cutting paper and like material, and more particularly to means for adjusting and controlling the cutting mechanism thereof.

In a cutting machine of the character described, as usually constructed, a cutting knife or blade is mounted for reciprocating travel with respect to a work table adapted to receive the material to be cut. A single pull bar or a pair of pull bars are connected at opposite ends of the knife to transmit reciprocating motion thereto from a crank or other power source. In operation it has been found that to obtain proper cutting action and efficiency the pull bars should be adjusted so that on the down stroke the knife just touches or kisses the cutting stick on the work table and this relation should occur across the entire length of the knife. When necessary to make such an adjustment in order to obtain the proper cutting stroke, the knife is raised or lowered with respect to the work table by adjusting the pull bars, which according to the general practice are threaded into knife yokes, and which in turn are pivotally connected to the knife bar. Where it has been the custom to construct the pull bars so that the threaded ends thereof extend out of the yokes, lock nuts are used thereon to prevent the pull bars from turning after an adjustment has once been made. This construction thus makes it necessary to use a double end wrench, one end for the nut and the other end for the bar in order to make an adjustment of the knife, and after making such an adjustment it is also necessary for the operator to tighten the lock nut to prevent the parts from creeping and causing the knife to dig into the cutting stick or to fail to cut through the lowermost sheet at one or both sides. Even when adjusted properly initially the continued reciprocating and rocking motion of the pull bar tends to loosen the usual lock nut construction and thus allow the bar to creep, requiring stopping of the machine and readjustment of its setting.

Accordingly, it is one of the principal objects of the invention to provide a cutting machine having pull bars mounted to impart a reciprocating motion to a cutting knife or blade with respect to a work table, and so arranged and constructed that the pull bars can be raised or lowered easily and rapidly with respect to the knife yokes without requiring the use of tools, or the loosening and subsequent tightening of a lock nut, and which provides for establishing and maintaining accurate adjustment of the knife so that it will just touch the cutting stick on the work table at the bottom of its stroke.

A further object is to provide a machine of the character described in which there are adjustable pull bars controlling the reciprocating travel of the knife with respect to the work table that can be easily and quickly adjusted manually after releasing a locking mechanism which allows the pull bar to be turned by hand to obtain the desired adjustment, and which provides an automatic, positive locking means which upon release will spring back into a locked position and prevent any tendency of the parts to creep and cause the knife to either dig into the cutting stick or fall short thereof on the down stroke.

Other objects and advantages will be apparent from the following description, the accompanying drawing and the appended claims.

In the drawing—

Fig. 1 is a perspective view of a cutting machine constructed in accordance with the present invention;

Fig. 2 is a front elevational view of a portion of a pull bar connected to a knife yoke showing the collar withdrawn from the locking plate, part of the collar being broken away and in section; and Fig. 3 is a plan view in elevation of the locking plate.

Referring to the drawing which discloses a preferred embodiment of the invention, the machine comprises a base 10 having integral side frame members 11 and 12 serving as supports and guides in which the knife 13 is mounted for reciprocating travel with respect to the work table 16 which is provided to receive the material to be cut. The knife is carried in the usual manner in the knife bar 17 which has a U-shaped coupling 18 which may be pivotally connected at each end thereof by means of the pins 19 which are journaled in the bar.

The knife yokes or couplings 20 are in turn pivotally suspended from the couplings 18 on the pins 21 which are inserted through the looped portion of the coupling and the upper end of the yoke, and which allow relatively free movement of the yokes with respect to the couplings. Each yoke has a threaded central bore 24 extending vertically through the lower part thereof adapted to align with the center bore provided in the ring shaped plate member or plate 25 which is attached to the lower ends of the yokes by means of the headed screws 26. This ring shaped member is also provided on its interior with a plurality of serrations or teeth 27 cut so as to extend around the inside of the center bore as illustrated in Fig. 3.

A pull bar 30 having a cross section of hexagonal or other non-circular shape and its upper end threaded so as to be received within the bore 24 of the yoke as shown in Fig. 2 is provided at each end of the knife bar. Slideably mounted on the pull bar is a collar 31 which is broached with a cooperating hexagonal bore so that it will not turn on the hexagonal-shaped pull bar. This collar has an annular groove 32 extending around the upper end thereof and also has the lower part thereof covered with a diamond knurl 33 to provide a convenient grip for the fingers of the operator. The upper end of the collar also has a flanged portion or ring shaped member 34 formed as an integral part thereof which is provided with serrations or teeth 35 extending around the outer periphery which are adapted to cooperate with the serrations 27 of the ring shaped member 25 to form a spline adapted to hold the pull bar against any turning movement.

To facilitate the cooperation of the collar with respect to the ring shaped member a coiled spring 36 is provided which encircles the pull bar and has its upper end abutting against the lower end of the collar, and is held in this position by means of a retaining ring 37 which is integrally fastened to the pull bar.

At the lower ends the pull bars are threadedly received in yokes coupled to the driving mechanism generally indicated by the crank mechanism 40 which is of a type suitable to impart a reciprocating motion thereto. Power is supplied by means of a motor 41 connected through drive belts, gears, clutches, etc., in the usual manner.

In operation it will be apparent that after the collar 31 has been drawn downwardly the bar may be turned and by properly fitting the threads, the turning may usually be done by hand and without the use of a tool. When the collar is released the spring beneath it urges it back to engagement with the serrations. If the serrations are not in line, a very limited relative movement of the collar and ring will cause it to drop into place and thereafter no further movement can occur, and thus no further creeping is possible. It is to be particularly noted, however, that by means of the engagement between the collar 31 and the ring shaped member 25 a positive locking means normally in locking position is provided which is effective between the coupling member or yoke 20 and the pull bar 30 for retaining a predetermined adjustment of one with respect to the other, and which also provides for relocking which automatically takes place after the manual unlocking and knife adjustment has been made. Thus no separate locking is required since locking automatically takes place upon release of the collar 31 and the locking is positive and not dependent upon any frictional engaging means.

While the form of apparatus herein described constitutes a preferred embodiment of the invention, it is to be understood that the invention is not limited to this precise form of apparatus and that changes may be made therein without departing from the scope of the invention which is defined in the appended claims.

What is claimed is:

1. In a machine for cutting paper and the like having a work table for receiving the material to be cut, a cutting knife, a reciprocatory knife bar for supporting said knife and a drive, the combination of a crank operated from said drive, a non-circular pull bar connected to said crank, a coupling member connecting said pull bar to said knife bar for reciprocation of the latter through a cutting stroke, threaded means for adjusting the connection between said pull bar and said knife bar to provide for determining the position of said knife relative to said table at the bottom of its stroke, and releasable locking means effective between said coupling member and said pull bar including disengageable members on said coupling member and on said non-circular pull bar respectively adapted to cooperate to prevent relative rotational movement between said coupling member and said pull bar when engaged.

2. In a machine for cutting paper and the like having a work table for receiving the material to be cut, a cutting knife, a reciprocatory knife bar for supporting said knife and a drive, the combination of a crank operated from said drive, a non-circular pull bar connected to said crank, a coupling member connecting said pull bar to said knife bar for reciprocation of the latter through a cutting stroke, threaded means for adjusting the connection between said pull bar and said knife bar to provide for determining the position of said knife relative to said table at the bottom of its stroke, and releasable locking means effective between said coupling member and said pull bar including a ring shaped member on said coupling member and a collar on said non-circular pull bar adapted to interfit with said ring to provide a releasable locking relation between said pull bar and said coupling member which maintains a predetermined adjustment thereof and provides for direct release and readjustment thereof.

3. In a machine for cutting paper and the like having a work table for receiving the material to be cut, a cutting knife, a reciprocatory knife bar for supporting said knife and a drive, the combination of a rotary crank operated from said drive, a non-circular pull bar connected to said crank, a coupling member connecting said pull bar to said knife bar for reciprocation of the latter through a cutting stroke, threaded means for adjusting the connection between said pull bar and said knife bar to provide for determining the position of said knife relative to said table at the bottom of its stroke, and releasable locking means effective between said coupling member and said pull bar including a ring on said coupling member and a collar slidably mounted on said non-circular pull bar adapted to engage said ring to prevent said pull bar from turning with respect to said coupling member when engaged.

4. In a machine for cutting paper and the like having a work table for receiving the material to be cut, a cutting knife, a reciprocatory knife bar for supporting said knife and a drive, the combination of a rotary crank operated from said drive, a non-circular pull bar connected to said crank, a coupling member connecting said pull bar to said knife bar for reciprocation of the latter through a cutting stroke, threaded means for adjusting the connection between said pull bar and said knife bar to provide for determining the position of said knife relative to said table at the bottom of its stroke, and releasable locking means effective between said coupling member and said pull bar including a ring having a plurality of teeth attached to said coupling and a collar provided with a plurality of teeth slidably mounted on said non-circular pull bar adapted to releasably engage with each other for maintaining a predetermined adjustment and providing for direct release and readjustment between said pull bar and said coupling.

5. In a machine for cutting paper and the like having a work table for receiving the material to be cut, a cutting knife, a reciprocatory knife bar for supporting said knife and a drive, the combination of a rotary crank operated from said drive, a pull bar having a non-circular cross section and connected to said crank, a coupling member connecting said pull bar to said knife bar for reciprocation of the latter through a cutting stroke, threaded means for adjusting the connection between said pull bar and said knife bar to provide for determining the position of said knife relative to said table at the bottom of its stroke, and releasable locking means effective between said coupling member and said pull bar including a ring having a plurality of teeth attached to said coupling and a collar provided with a plurality of teeth slidably received on said non-circular pull bar adapted to releasably engage with each other for maintaining a predetermined adjustment and providing for direct release and readjustment between said non-circular pull bar and said coupling.

WILLIAM R. SPILLER.

REFERENCES CITED

The following references are of record in the file of this patent:

UNITED STATES PATENTS

| Number | Name | Date |
| --- | --- | --- |
| 968,171 | Lodge | Aug. 23, 1910 |
| 1,028,920 | Wadhams | June 11, 1912 |
| 1,451,120 | Seybold | Apr. 10, 1923 |
| 1,710,084 | Berry | Apr. 23, 1929 |